US012117148B1

(12) United States Patent
Zheng

(10) Patent No.: US 12,117,148 B1
(45) Date of Patent: Oct. 15, 2024

(54) DOWNLIGHT

(71) Applicant: JOININ GLOBAL PTE. LTD., Singapore (SG)

(72) Inventor: Hongbing Zheng, Hangzhou (CN)

(73) Assignee: JOININ GLOBAL PTE. LTD., Singapore (SG)

( * ) Notice: Subject to any disclaimer, the term of this patent is extended or adjusted under 35 U.S.C. 154(b) by 0 days.

(21) Appl. No.: 18/430,691

(22) Filed: Feb. 2, 2024

(30) Foreign Application Priority Data

Sep. 22, 2023 (CN) ......................... 202311231874.3
Sep. 22, 2023 (CN) ......................... 202322585262.6

(51) Int. Cl.
*F21V 21/14* (2006.01)
*F21S 8/02* (2006.01)
*F21Y 115/10* (2016.01)

(52) U.S. Cl.
CPC .............. *F21V 21/14* (2013.01); *F21S 8/026* (2013.01); *F21Y 2115/10* (2016.08)

(58) Field of Classification Search
CPC .......... F21Y 215/10; F21S 8/026; F21V 12/14
See application file for complete search history.

(56) References Cited

U.S. PATENT DOCUMENTS

2020/0072444 A1* 3/2020 Bokros ................. F21V 17/002
2021/0102690 A1* 4/2021 Zeng ....................... F21S 8/026

FOREIGN PATENT DOCUMENTS

CN 209399237 U * 9/2019 .............. F21V 21/04
CN 209540629 U * 10/2019 ................ F21S 8/02

OTHER PUBLICATIONS

Innovation Q+ NPL Search (Year: 2024).*

* cited by examiner

*Primary Examiner* — Anabel Ton
(74) *Attorney, Agent, or Firm* — IPRTOP LLC

(57) ABSTRACT

A downlight comprising a lamp body and a surface ring is disclosed. The lamp body is provided with at least one first clamping part and second clamping part. A spring part is connected to the lamp body through the first or second clamping part. The lamp body is detachably connected with the surface ring. This disclosure enables flexible installation of downlights with installation barrels of different sizes by connecting ether the first or second clamping part with the spring part. By configuring a detachable connection mode between the lamp body and the surface ring, this disclosure enables the separation of the surface ring from the lamp body, reducing the packaging and transportation space. By configuring an infinite-position clamping connection mode between the lamp body and the surface ring, this disclosure enables a 360-degree fastening installation therebetween, making the downlight structure more sturdy and the installation more convenient.

11 Claims, 11 Drawing Sheets

2 : 1

G-G

I
5 : 1

DOWNLIGHT

FIELD OF THE INVENTION

The present disclosure relates to the technical field of light fixtures, and in particular relates to a downlight.

BACKGROUND OF THE INVENTION

People's living standards have improved over time, and so has their demand for better lighting. LED downlights are a type of light fixture that is embedded in the ceiling and shines light downward. They are usually installed around the ceilings of bedrooms, living rooms, and bathrooms. Downlights can create different lighting effects by using different light sources, light guides, and diffuser plates. Moreover, downlights do not take up large space, and they can enhance the softness and coziness of the space. If people want to make the space feel warmer, they can try installing more downlights to reduce the sense of pressure.

In related technology, one of the installation methods for downlights is replacement installation, which is mainly used to replace the original downlights and achieve the same decoration effect. For safety and fire prevention reasons, downlights are usually installed in iron installation barrels. The interior of the barrel is crude, so a decorative ring is added to the edge of the barrel. The decorative rings and downlights on the market are integrated, which makes the whole lamp body too large and not easy to replace. In addition, there are two sizes of barrels on the market, 5 inches and 6 inches, and the current downlights cannot fit both sizes of barrels.

SUMMARY OF THE INVENTION

In view of the above-mentioned shortcomings, the present disclosure provides a downlight to solve the problem in related technology that downlights are not compatible with both 5-inch and 6-inch installation barrels.

The downlight comprises a lamp body and a surface ring. The lamp body is provided with at least one first clamping part and at least one second clamping part. At least one spring part is matingly connected to the lamp body through the first clamping part or the second clamping part. The lamp body is detachably connected with the surface ring.

This disclosure enables flexible installation of downlights with installation barrels of different sizes by matingly connecting ether the first or second clamping part on the lamp body with the spring part, making the downlight compatible with both 5-inch and 6-inch installation barrels. By configuring a detachable connection mode between the lamp body and the surface ring, this disclosure enables the separation of the surface ring from the lamp body, which greatly reduces the packaging and transportation space.

In an embodiment, the lamp body has an opening; the first clamping part and the second clamping part are disposed at an outer region of a bottom plate of the lamp body; at least one connecting lug is disposed at an edge of the outer region of the bottom plate of the lamp body; each connecting lug corresponds to one of the at least one first clamping part, and one of the at least one second clamping part, and each connecting lug shares a same axis with the corresponding first clamping part and second clamping part.

In an embodiment, the first clamping part and the second clamping part comprise buckles.

In an embodiment, the buckles are protruding buckles.

In an embodiment, the first clamping part is a protruding buckle; the second clamping part is a U-shaped protruding buckle; the first clamping part is located in the second clamping part; a length of the first clamping part is smaller than a width of the second clamping part.

In an embodiment, the lamp body is provided with at least two groups of first clamping parts, second clamping parts, and connecting lugs.

In an embodiment, the spring part is L-shaped; the spring part comprises a spring body and two elastic arms, wherein the two elastic arms extend outwardly from the spring body at different angles; the spring body is provided with a spring fixing frame; the spring fixing frame is a lengthened and outwardly bended coil of the spring body; the spring fixing frame is matingly connected with the first clamping part or second clamping part through the connecting lug.

In an embodiment, a first connecting part is disposed at an outer side wall of the lamp body; the first connecting part is of a circular structure, whose substructures are uniformly distributed around the outer side wall of the lamp body; the lamp body is matingly connected with the surface ring through the first connecting part.

In an embodiment, a second connecting part is disposed at an inner side wall of the surface ring; the second connecting part is of a circular structure, whose substructures are uniformly distributed around the inner side wall of the surface ring; the second connecting part is matingly connected with the first connecting part.

In an embodiment, the first connecting part is a buckle and is disposed at a lower end of the outer side wall of the lamp body; the second connecting part is a slot and is disposed at an upper end of the inner side wall of the surface ring.

In an embodiment, the first connecting part is a slot and is disposed at a lower end of the outer side wall of the lamp body; the second connecting part is a buckle and is disposed at an upper end of the inner side wall of the surface ring.

In an embodiment, the surface ring is of a concave structure.

As described above, the present disclosure has the following advantages.

1. This disclosure enables flexible installation of downlights with installation barrels of different sizes by matingly connecting ether the first or second clamping part on the lamp body with the spring part, making the downlight compatible with both 5-inch and 6-inch installation barrels. The problem that existing downlights are not compatible with both 5-inch and 6-inch installation barrels has been solved.

2. By configuring a detachable connection mode between the lamp body and the surface ring, this disclosure enables the separation of the surface ring from the lamp body, which greatly reduces the packaging and transportation space. Moreover, by configuring an infinite-position clamping connection mode between the lamp body and the surface ring, this disclosure enables a 360-degree fastening installation therebetween, making the downlight structure more sturdy and the installation more convenient.

3. The surface ring has a concave structure, which allows multiple surface rings to be stacked together during transportation, saving the packaging and transportation space.

4. The spring part is L-shaped, which eliminates the need for screws to fix the spring part, achieving high-point fixation and low-point limitation, and allows changing the position of the buckle. This also solves the problem regarding the installation height of the spring part.

REFERENCE NUMERALS

Figure 1:
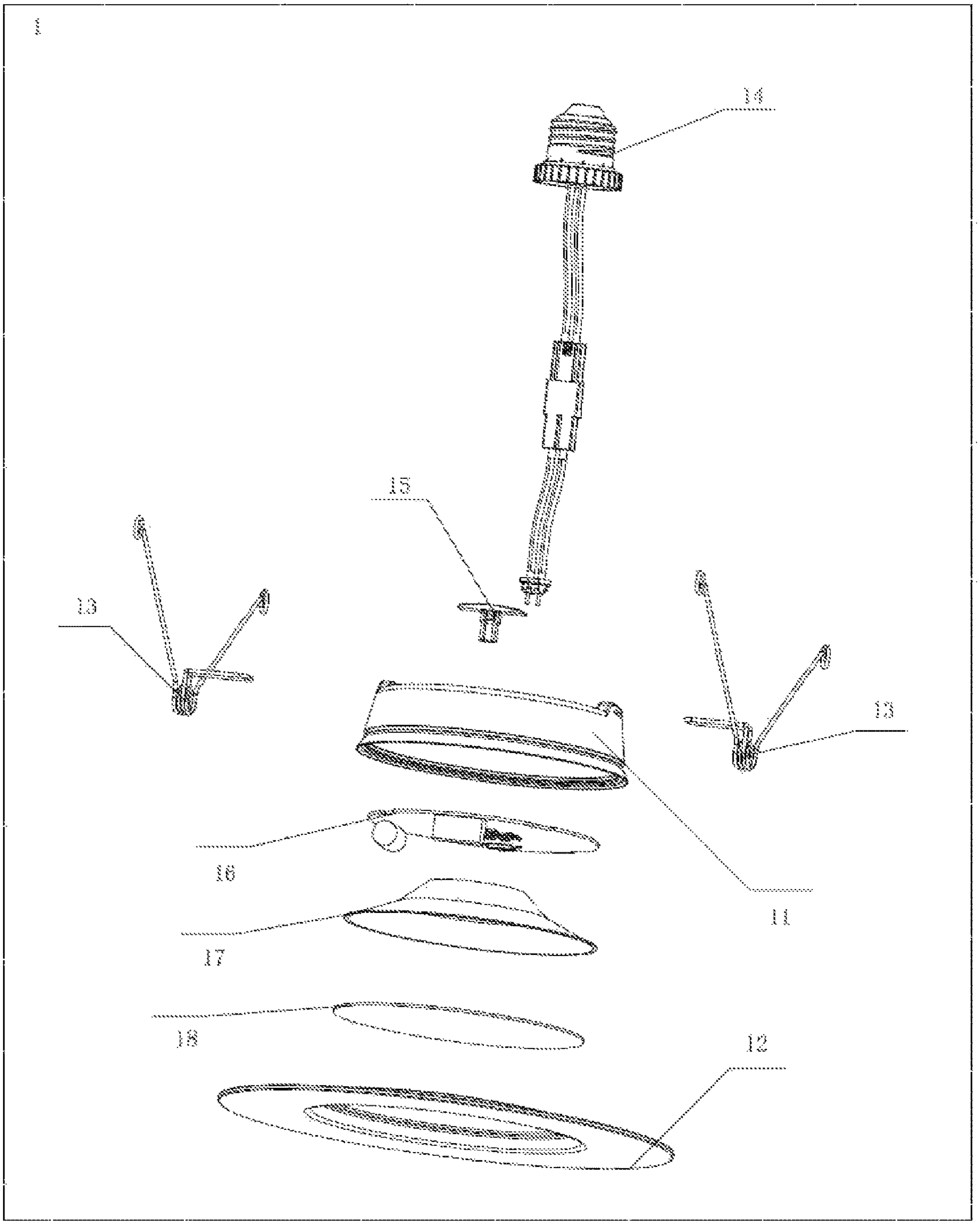
FIG. 1 is an exploded view of a downlight according to an embodiment of the present disclosure.

1 Downlight
11 Lamp body
111, 111*a* First clamping parts
112, 112*a* Second clamping parts
113, 113*a* Connecting lugs
114 First connecting part
115 First fixing hole
116 Second fixing comb
12 Surface ring
121 Second connecting part
13 Spring part
131 Spring body
1311 Spring fixing frame
132 Elastic arms
14 Lamp base
15 Dip switch
16 Aluminum substrate
17 Reflector cup
18 Diffuser plate

DETAILED DESCRIPTION OF THE INVENTION

The embodiments of the present disclosure will be described below according to the following specific examples. Those skilled can easily understand other advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure. It should be noted that the following embodiments and the features of the following embodiments can be combined with each other if no conflict will result.

It should be noted that the drawings provided in this disclosure only illustrate the basic concept of the present disclosure in a schematic way, so the drawings only show the components closely related to the present disclosure. The drawings are not necessarily drawn according to the number, shape, and size of the components in actual implementation; during the actual implementation, the type, quantity, and proportion of each component can be changed as needed, and the components' layout may also be more complicated.

The downlight of the present disclosure can solve two problems of the existing downlights: they are not compatible with both 5-inch and 6-inch installation barrels, and they require a large packaging and transportation space due to the fact that the lamp body and the surface ring are integrated and cannot be detached from each other.

The principle and implementation of connecting the spring part with the clamping parts will be described in detail below, assuming that the clamping parts are of the structures shown in FIG. 2*a* or 2*b*, so that the skilled person in the field can understand them without creative labor.

Referring to FIG. 1, the downlight 1 comprises a lamp body 11 and a surface ring 12. Referring to FIG. 2*a*, the lamp body 11 is provided with at least one first clamping part 111 and at least one second clamping part 112. At least one spring part 13 is matingly connected to the lamp body 11 through the first clamping part 111 or the second clamping part 112. The lamp body 11 is detachably connected with the surface ring 12.

This disclosure enables flexible installation of downlights with installation barrels of different sizes by matingly connecting ether the first or second clamping part on the lamp body with the spring part, making the downlight compatible with both 5-inch and 6-inch installation barrels. The problem that existing downlights are not compatible with both 5-inch and 6-inch installation barrels has been solved. By configuring a detachable connection mode between the lamp body and the surface ring, this disclosure enables the separation of the surface ring from the lamp body, which greatly reduces the packaging and transportation space. Moreover, by configuring an infinite-position clamping connection mode between the lamp body and the surface ring, this disclosure enables a 360-degree fastening installation therebetween, making the downlight structure more sturdy and the installation more convenient.

Figure 2A:
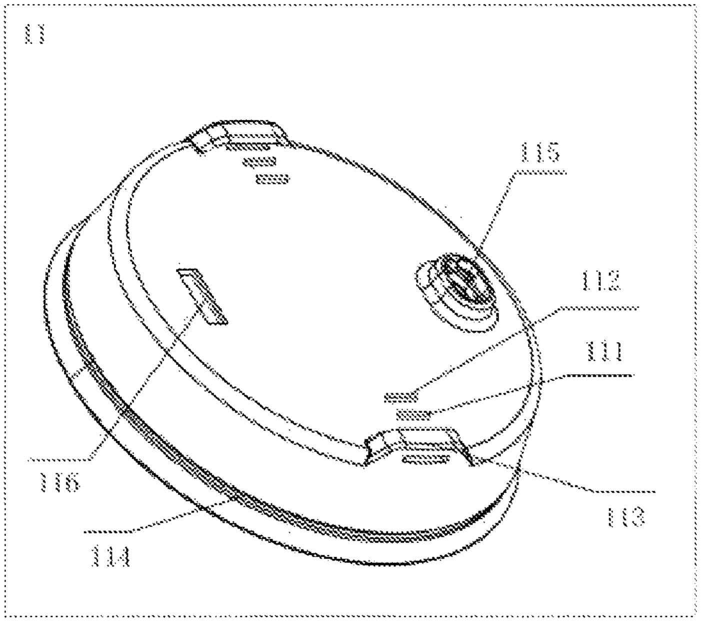
FIG. 2*a* is a schematic structural diagram of a lamp body according to an embodiment of the present disclosure.

In an embodiment of the present disclosure, referring to FIG. 2*a*, the lamp body 11 has an opening. The first clamping part 111 and the second clamping part 112 are disposed at an outer region of a bottom plate of the lamp body. At least one connecting lug 113 is disposed at an edge of the outer region of the bottom plate of the lamp body. Each connecting lug 113 corresponds to one of the at least one first clamping part 111 and one of the at least one second clamping part 112, and each connecting lug 113 shares a same axis with the corresponding first clamping part and second clamping part.

Specifically, there is a certain distance between the first clamping part 111 and the second clamping part 112, and the distance can be adjusted based on dimensions of the corresponding installation barrel. For example, there are 5-inch and 6-inch installation barrels on the market. By adjusting the distance between the first and second clamping parts, the downlight can match the 6-inch installation barrels when each spring part connects with a first clamping part, and the downlight can match the 5-inch installation barrels when each spring part connects with a second clamping part. This disclosure enables flexible installation of downlights with installation barrels of different sizes by matingly connecting either the first or second clamping part on the lamp body with the spring part, making the downlight compatible with both 5-inch and 6-inch installation barrels. The problem that existing downlights are not compatible with both 5-inch and 6-inch installation barrels has been solved.

In an embodiment of the present disclosure, the first clamping part and the second clamping part comprise buckles.

Specifically, each buckle is shaped to fit a spring fixing frame of the corresponding spring part. The shapes of the buckles will be described in detail below in connection with FIGS. 2*a* and 2*b*.

In an embodiment of the present disclosure, referring to FIG. 2*a*, the first clamping part 111 and the second clamping part 112 are protruding buckles.

Specifically, the first clamping part 111 and the second clamping part 112 are both right-angled trapezoidal buckles. An inclined surface of the first clamping part 111 faces away from an inclined surface of the second clamping part 112, and the inclined surface of the second clamping part 112 is adjacent to a vertical surface of the first clamping part 111.

Figure 2B:
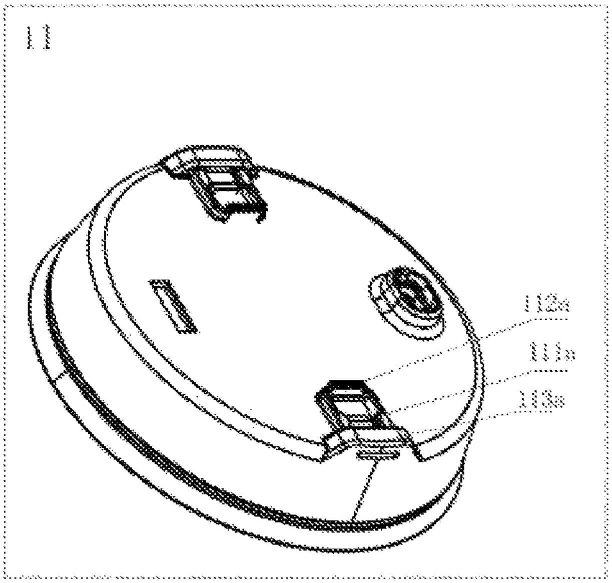
FIG. 2*b* is a schematic structural diagram of a lamp body according to another embodiment of the present disclosure.

In an embodiment of the present disclosure, referring to FIG. 2*b*, a first clamping part 111*a* is a protruding buckle. A second clamping part 112*a* is a U-shaped protruding buckle. The first clamping part 111*a* is located in the second clamping part 112*a*. A length of the first clamping part 111*a* is smaller than a width of the second clamping part 112*a*.

Specifically, the first clamping part 111*a* is a right-angled trapezoidal buckle, and an inclined surface of the first clamping part 111*a* is away from a U-shaped edge of the second clamping part 112*a*. The U-shaped edge of the second clamping part 112*a* is parallel to a vertical surface of the first clamping part 111*a*.

The shapes of the first and second clamping parts are not limited to those shown in FIGS. 2*a* and 2*b*. Any structural deformation made based on FIGS. 2*a* and 2*b* is included in the scope of the present disclosure.

The principle and implementation of connecting the spring part with the clamping parts will be described in detail below, assuming that the clamping parts are of the structures shown in FIG. 2*a* or 2*b*, so that the skilled person in the field can understand them without creative labor.

In an embodiment of the present disclosure, referring to FIG. 2*a*, the lamp body 11 is provided with at least two groups of first clamping parts 111, second clamping parts 112, and connecting lugs 113.

Specifically, as shown in FIG. 2*a*, there are two groups of first clamping parts 111, second clamping parts 112, and connecting lugs 113 disposed on the lamp body 11. Each group comprises one first clamping part 111, one second clamping part 112, and one connecting lug 113. The first clamping parts 111 and the second clamping parts 112 are both protruding buckles. Each first clamping part 111 corresponds to one of the second clamping parts 112, and a length direction of the first clamping part 111 is parallel to that of the corresponding second clamping part 112.

In an embodiment, the two groups of first clamping parts 111, second clamping parts 112, and connecting lugs 113 are symmetrically distributed on two sides of the outer region of the bottom plate of the lamp body. In an embodiment, the two groups of first clamping parts 111, second clamping parts 112, and connecting lugs 113 are asymmetrically distributed on the two sides of the outer region of the bottom plate of the lamp body. The number of groups of first clamping parts 111, second clamping parts 112, and connecting lugs 113 may also be three or more, and can be adjusted as needed.

In an embodiment of the present disclosure, referring to FIG. 2*b*, there are two groups of first clamping parts 111*a*, second clamping parts 112*a*, and connecting lugs 113*a* disposed on the lamp body 11. Each connecting lug 113*a* corresponds to one of the first clamping parts 111*a*, and one of the second clamping parts 112*a*, and each connecting lug 113 shares a same axis with the corresponding first clamping part and second clamping part. The first clamping parts 111*a* are protruding buckles. The second clamping parts 112*a* are U-shaped protruding buckles. Each first clamping part 111*a* corresponds to one of the second clamping parts 112*a*, and the first clamping part 111*a* is located in the corresponding second clamping part 112*a*. A length of the first clamping part 111*a* is smaller than a width of the corresponding second clamping part 112*a*. The first clamping part 111*a* is parallel to the U-shaped edge of the corresponding second clamping part 112*a*.

In an embodiment, the two groups of first clamping parts 111*a*, second clamping parts 112*a*, and connecting lugs 113*a* are symmetrically distributed on the two sides of the outer region of the bottom plate of the lamp. In an embodiment, the two groups of first clamping parts 111*a*, second clamping parts 112*a*, and connecting lugs 113*a* are asymmetrically distributed on the two sides of the outer region of the bottom plate of the lamp. The number of groups of first clamping parts 111*a*, second clamping parts 112*a*, and connecting lugs 113*a* may also be three or more, and can be adjusted as needed.

The first and second clamping parts of the present disclosure do not affect the hole size or require screws to fix them. They together offer two different installation distances and allow a user to install the downlight freely.

Figure 3:
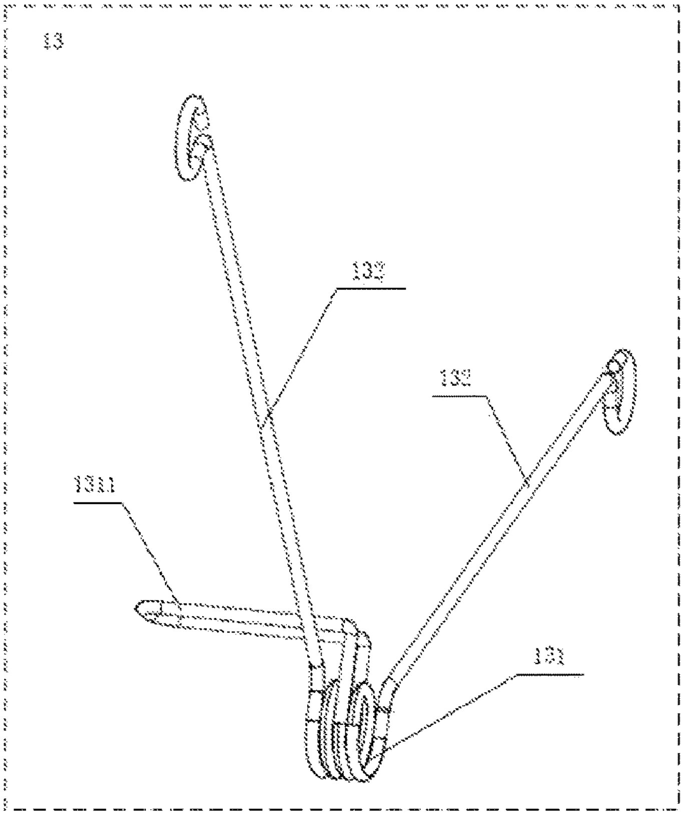
FIG. 3 is a schematic structural diagram of a spring part according to an embodiment of the present disclosure.

In an embodiment of the present disclosure, referring to FIG. 3, the spring part 13 is L-shaped. The spring part 13 comprises a spring body 131 and two elastic arms 132, wherein the two elastic arms 132 extend outwardly from the spring body at different angles. The spring body 131 is provided with a spring fixing frame 1311. The spring fixing frame 1311 is a lengthened and outwardly bended coil of the spring body 131. The spring fixing frame 1311 is matingly connected with the first clamping parts (111/111*a*) or the second clamping parts (112/112*a*) through the corresponding connecting lug (113/113*a*).

The connection principle between the spring part and the first and second clamping parts shown in FIG. 2*a* will be described in detail below.

Figure 4A:
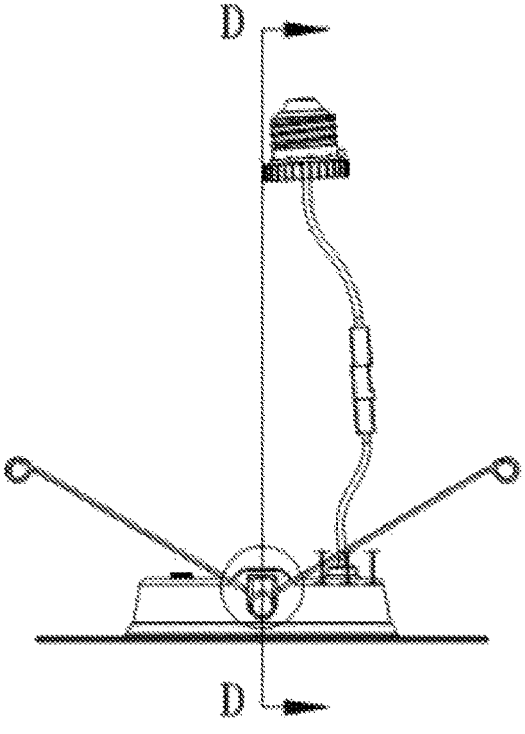
FIG. 4*a* is a schematic structural diagram of a downlight according to an embodiment of the present disclosure.
Figure 4B:
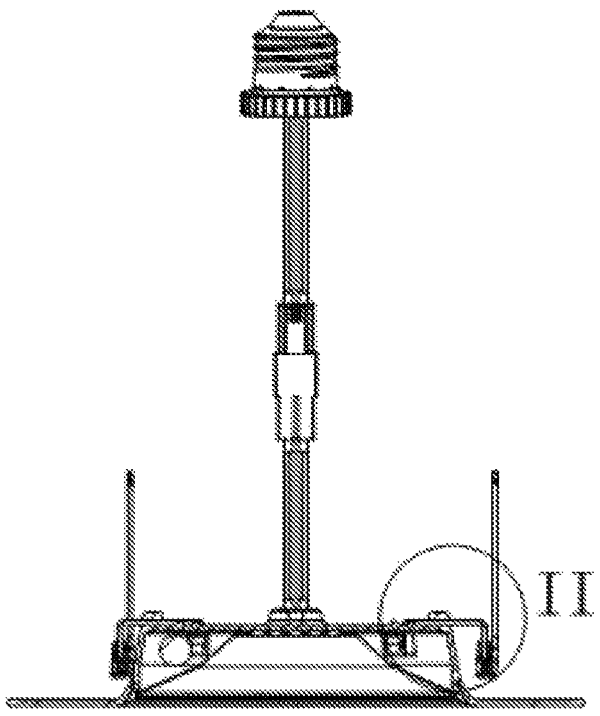
FIG. 4*b* is a schematic cross-sectional view of the downlight in FIG. 4*a*, with the cutting plane passing through D-D.
Figure 4C:
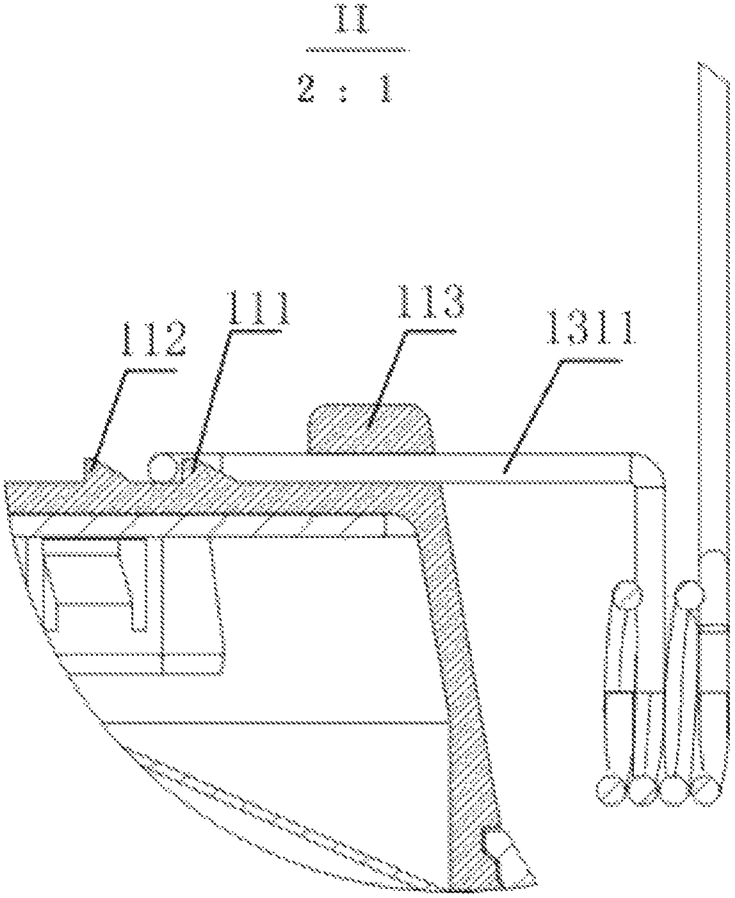
FIG. 4*c* is a partially enlarged schematic structural diagram showing the region II in FIG. 4*b*.

FIG. 4*a* shows a schematic view of a downlight according to an embodiment of the present disclosure. Line D-D divides the downlight along a central axis of the spring part. Please refer to FIG. 4*b*, which shows a schematic view showing the cross section at D-D in FIG. 4*a*. region II shown in FIG. 4*b* illustrates the cross section of the spring part when connecting with the corresponding first clamping part, second clamping part, and connecting lug. FIG. 4*c* is a partially enlarged schematic structural diagram of the region II. The spring fixing frame 1311 of the spring part 13 passes through the connecting lug 113 to matingly connected with the first clamping part 111, so that the downlight may be installed in a 6-inch installation barrel. If the user desires to install the downlight in a 5-inch installation barrel, the spring part is pushed inwardly to match the spring fixing frame 1311 with the second clamping part.

It should be noted that a width of the spring fixing frame 1311 matches that of the connecting lug (e.g., the two are substantially the same).

Figure 4D:
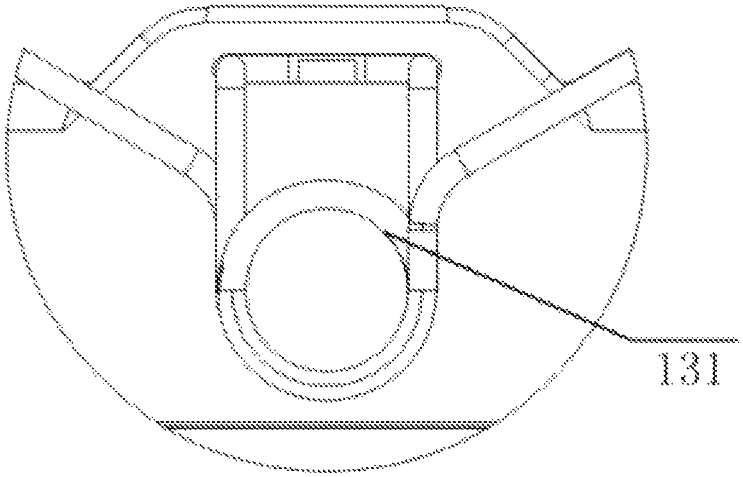
FIG. 4*d* is a partially enlarged schematic structural diagram showing the region III in FIG. 4*a*.

FIG. 4*d* is a partially enlarged schematic structural diagram showing the region III in FIG. 4*a*. The spring fixing frame 1311 is a lengthened and outwardly bended coil of the spring body 131. The spring fixing frame 1311 is matingly connected with the first clamping part 111 or the second clamping part 112 through the corresponding connecting lug 113.

The connection principle between the spring part and the first and second clamping parts shown in FIG. 2*b* will be described in detail below.

Figure 5A:
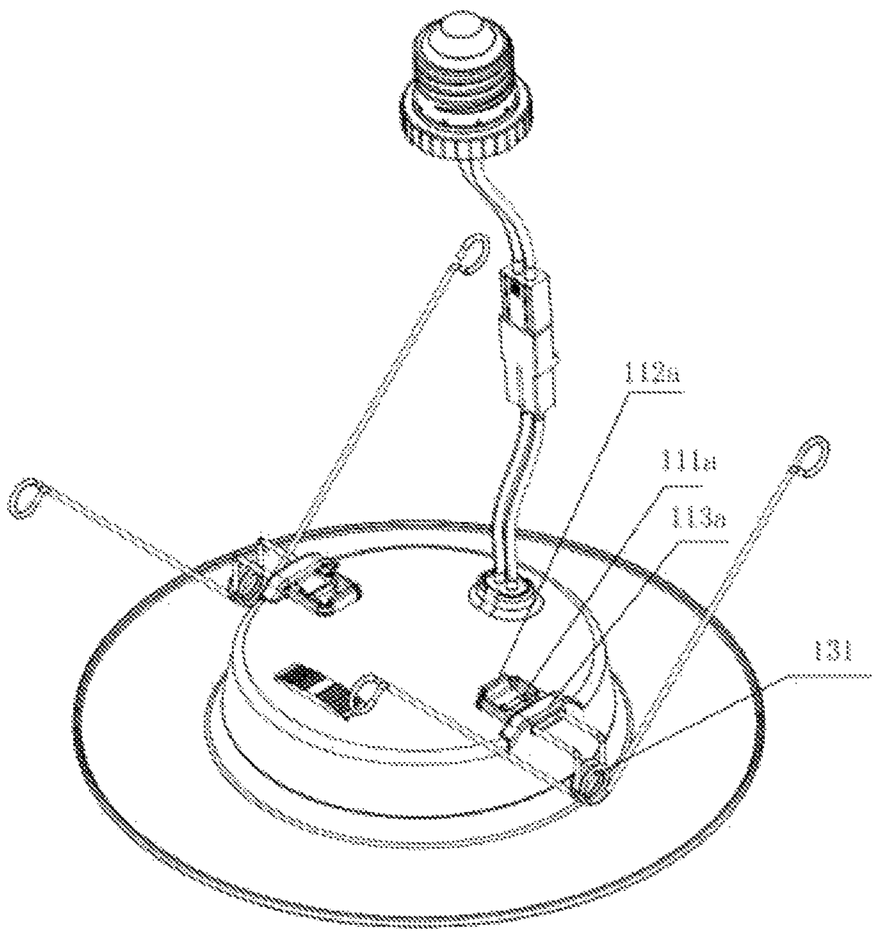
FIG. 5*a* is a schematic structural diagram of a downlight according to another embodiment of the present disclosure.
Figure 5B:
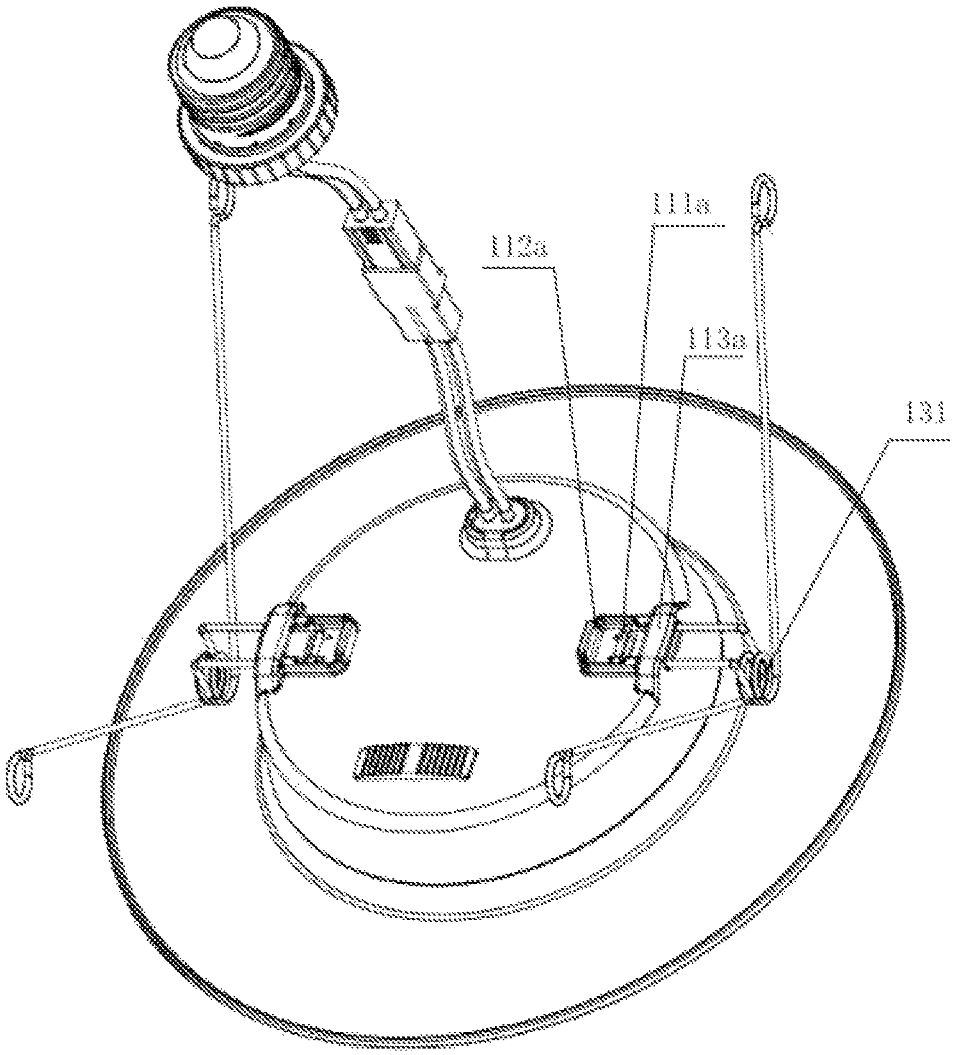
FIG. 5*b* is a schematic front view of the downlight in FIG. 5*a*.

Referring to FIGS. 5*a*-5*b*, which show schematic views of a downlight configuring with the first and second clamping parts shown in FIG. 2*b*.

Figure 5C:
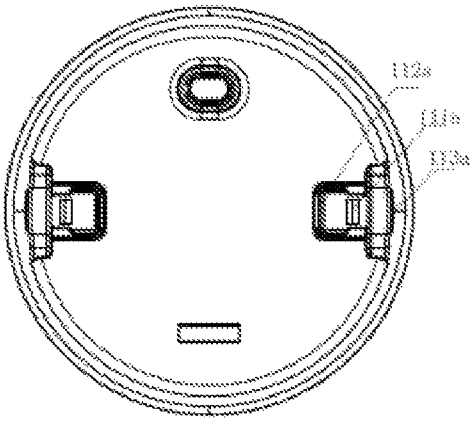
FIG. 5*c* is a schematic structural diagram showing the lamp body in FIG. 5*a*.

FIG. 5*c* is a schematic view showing the lamp body in FIGS. 5*a*-5*b*. The two groups of first clamping parts 111*a*, second clamping parts 112*a*, and connecting lugs 113*a* are disposed on the lamp body 11. The first clamping parts 111*a* are protruding buckles. The second clamping parts 112*a* are U-shaped protruding buckles. The first clamping part 111*a* is located in the corresponding second clamping part 112*a*. The length of the first clamping part 111*a* is smaller than the width of the corresponding second clamping part 112*a*. The vertical surface of the first clamping part 111*a* is parallel to the U-shaped edge of the corresponding second clamping part 112*a*.

Figure 5D:
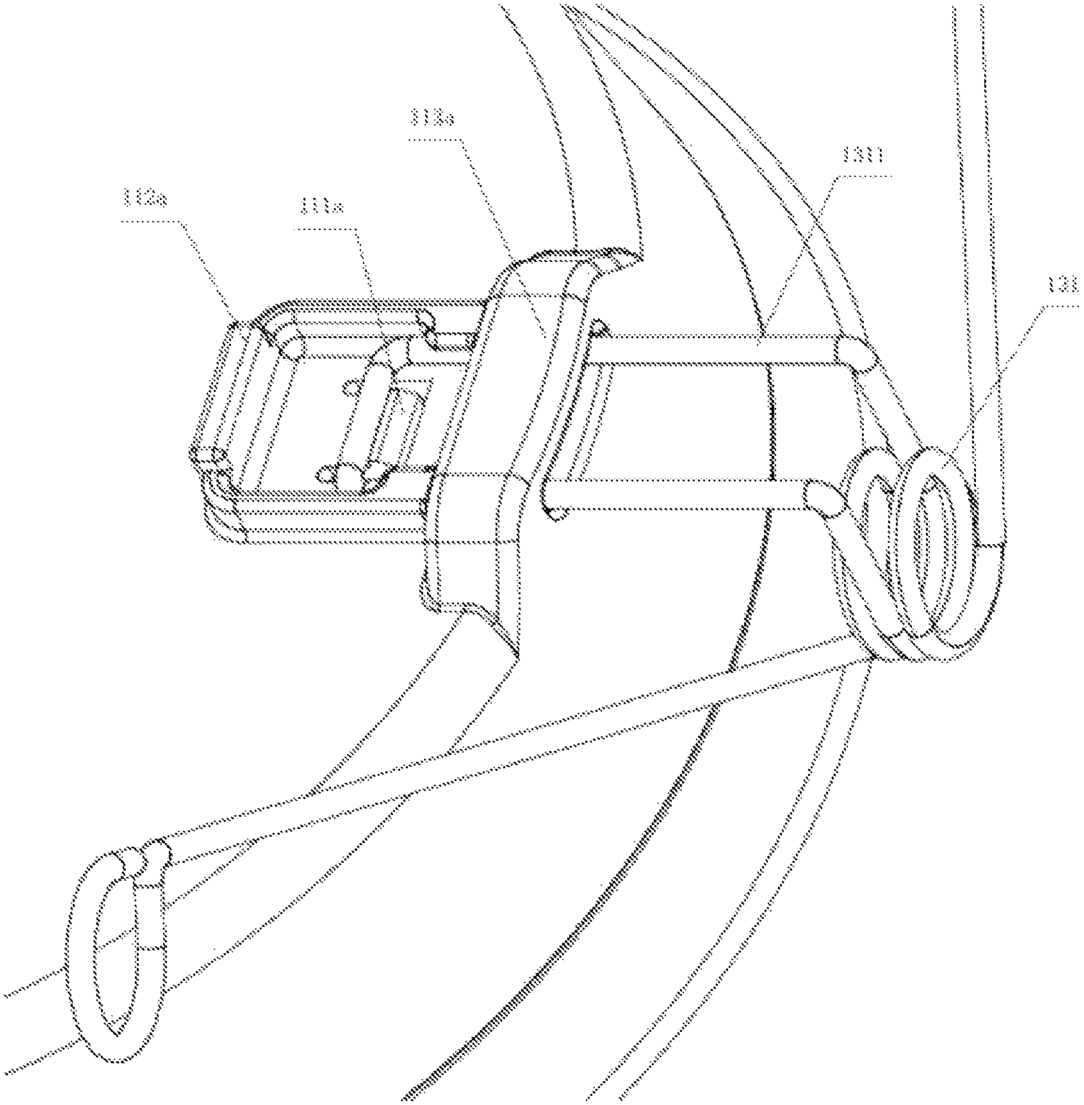
FIG. 5*d* is a schematic structural diagram showing the connection between the lamp body and the spring part in FIG. 5*a*.

FIG. 5*d* is a schematic view showing the connection between the lamp body and the spring part in FIGS. 5*a*-5*b*. The first clamping part 111*a* and the second clamping part 112*a* enclose a groove between them, and the spring fixing frame 1311 of the spring body 131 is movable within the groove. When the spring fixing frame 1311 connects with the U-shaped edge of the second clamping part 112*a*, the downlight may be installed in a 5-inch installation barrel, and when the spring fixing frame 1311 connects with a side edge of the first clamping part 111*a* adjacent to the U-shaped edge of the second clamping part 112*a*, the downlight may be installed in a 6-inch installation barrel.

Compared with conventional designs, the spring part and the lamp body of the present disclosure are connected without screws, achieving high-point fixation and low-point limitation, and allow changing the position of the buckle.

Two types of lamp bodies in FIGS. 2*a* and 2*b* are connected with the surface ring utilizing the same installation principle, so the following content will only take the lamp body in FIG. 2*a* as an example for detailed explanation.

Figure 6:
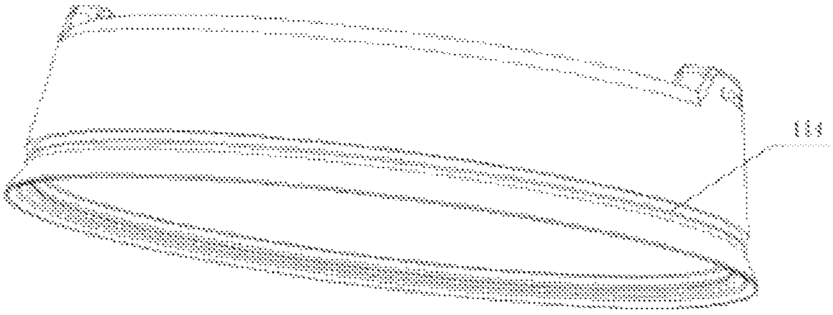
FIG. 6 is a schematic structural diagram of a lamp body according to a further embodiment of the present disclosure.

In an embodiment of the present disclosure, referring to FIG. 6, a first connecting part 114 is disposed at an outer side wall of the lamp body 11. The first connecting part 114 is of a circular structure, whose substructures are uniformly distributed around the outer side wall of the lamp body 11. The lamp body 11 is matingly connected with the surface ring 12 through the first connecting part 114.

Specifically, the first connecting part 114 is annular shaped.

Figure 7:
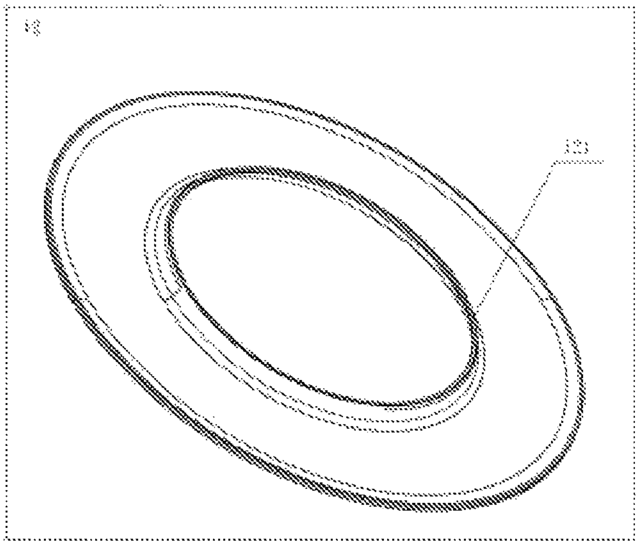
FIG. 7 is a schematic structural diagram of a surface ring according to an embodiment of the present disclosure.

In an embodiment of the present disclosure, referring to FIG. 7, the surface ring 12 is provided with a second connecting part 121. The second connecting part 121 is of a circular structure, whose substructures are uniformly distributed around an inner side wall of the surface ring 12. The second connecting part 121 is matingly connected with the first connecting part 114.

Specifically, the second connecting part 121 and the first connecting part 114 are both of a circular structure, the substructures of the second connecting part 121 are uniformly distributed around the inner side wall of the surface ring 12, and the substructures of the first connecting part 114 are uniformly distributed around the outer side wall of the lamp body 11. The first and second connecting parts can be engaged with each other in any relative orientation without using position-limiting structures. This makes the installation easier and faster, and increases the installation efficiency of the downlight.

In an embodiment of the present disclosure, the first connecting part 114 is a buckle and is disposed at a lower end of the outer side wall of the lamp body 11. The second connecting part 121 comprises slots and is disposed at an upper end of the inner side wall of the surface ring 12.

In an embodiment of the present disclosure, the first connecting part 114 comprises slots and is disposed at the lower end of the outer side wall of the lamp body 11. The second connecting part 121 is a buckle and is disposed at the upper end of the inner side wall of the surface ring 12.

In an embodiment of the present disclosure, referring to FIG. 7, the surface ring 12 is of a concave structure. That is, an inner edge (i.e., where the second connecting part 121 is) and/or an outer edge of the surface ring 12 extends a certain distance from the surface ring 12 in a direction towards the lamp body 11.

Specifically, by configuring a detachable connection mode between the lamp body and the surface ring, this disclosure enables the separation of the surface ring from the lamp body, and allows the surface ring and the downlight to be packaged individually during transportation and multiple surface rings to be stacked together, which greatly reduces the packaging and transportation space.

Figure 8A:
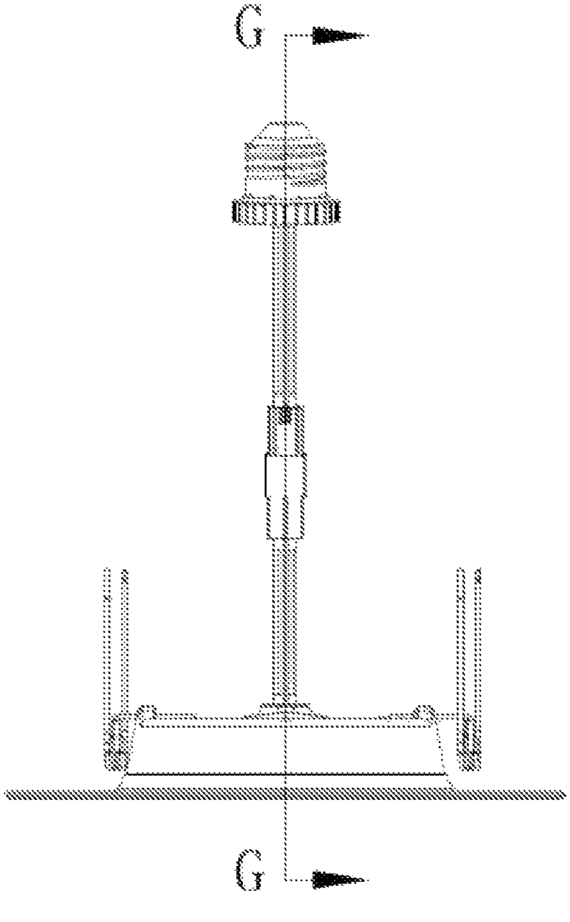
FIG. 8*a* is a schematic structural diagram of a downlight according to a further embodiment of the present disclosure.
Figure 8B:
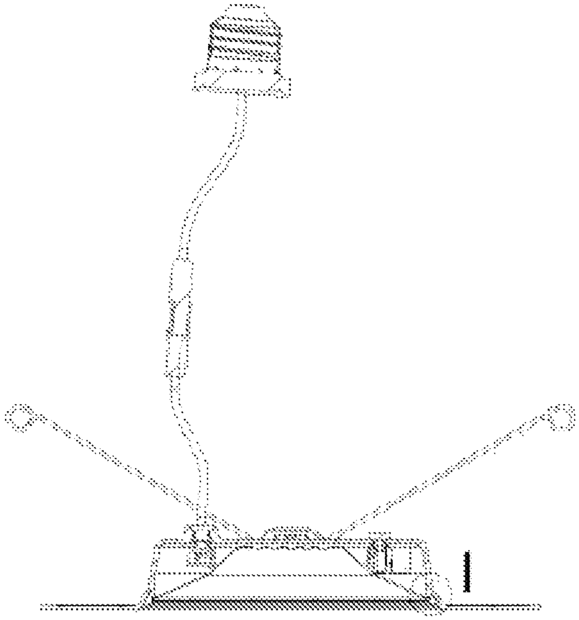
FIG. 8*b* is a schematic cross-sectional view of the downlight in FIG. 8*a*, with the cutting plane passing through G-G.
Figure 8C:
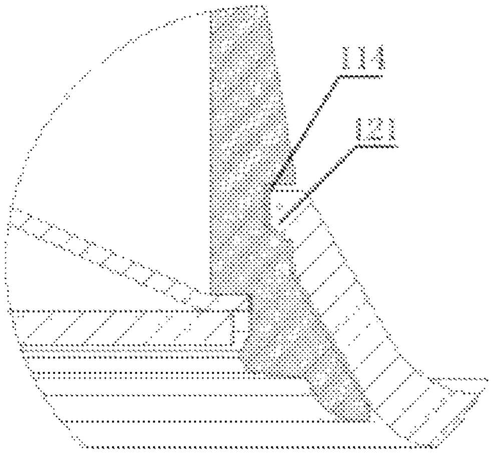
FIG. 8*c* is a partially enlarged schematic structural diagram showing the region I in FIG. 8*b*.

FIG. 8*a* is a schematic view of a downlight according to another embodiment of the present disclosure. Line G-G represents an axis with respect to which the two groups of first clamping parts 111, second clamping parts 112, and connecting lugs 113 are symmetrically disposed on the lamp body 11. FIG. 8*b* is a schematic cross-sectional view of the downlight in FIG. 8*a*, with the cutting plane passing through G-G. Region I shown in FIG. 8*b* illustrates the cross section of the lamp body when connecting with the surface ring. FIG. 8*c* is a partially enlarged schematic structural diagram of the region I. The first connecting part disposed at the lamp body is a slot, the second connecting part disposed at the surface ring is a buckle, and the first and second connecting parts can be matingly connected in any relative orientation without using position-limiting structures. This makes the installation easier and faster, and increases the installation efficiency of the downlight.

It should be noted that the above structures of the first and second connecting parts are merely illustrative, and the present disclosure is not limited thereto. In an embodiment of the present disclosure, the first connecting part may be a buckle, and the second connecting part may be a slot.

It should be noted that the above positions of the first and second connecting parts are merely illustrative, and the present disclosure is not limited thereto. In an embodiment of the present disclosure, the first connecting part may be disposed at the inner side wall of the lamp body, and the second connecting part may be disposed at the outer side wall of the surface ring. The structures and positions of the first and second connecting parts can be configured as needed, as long as they can connect the lamp body with the surface ring without using position-limiting structures. Also, the other components inside the downlight should be adjusted according to how the lamp body and the surface ring are connected.

In an embodiment of the present disclosure, referring to FIG. 1, the downlight further comprises a lamp base 14 and a dip switch 15. The lamp base 14 is electrically connected with a light source assembly of the downlight through a first fixing hole 115 on the lamp body 11. The lamp base 14 is electrically connected with the light source assembly through a wiring terminal. The dip switch 15 is electrically connected with the light source assembly through a second fixing hole 116 on the lamp body 11. The user can adjust the color and temperature of the downlight through the dip switch 15.

In an embodiment of the present disclosure, referring to FIG. 1, the downlight further comprises an aluminum substrate 16, a reflector cup 17, and a diffuser plate 18. The aluminum substrate 16, the reflector cup 17, and the diffuser plate 18 form the light source assembly of the downlight. The aluminum substrate 16, the reflector cup 17, and the diffuser plate 18 are sequentially placed in an accommodating groove enclosed by the lamp body 11 and the surface ring 12.

In summary, the present disclosure enables flexible installation of downlights with installation barrels of different sizes by matingly connecting ether the first or second clamping part on the lamp body with the spring part, making the downlight compatible with both 5-inch and 6-inch installation barrels. The problem that existing downlights are not compatible with both 5-inch and 6-inch installation barrels has been solved. By configuring a detachable connection mode between the lamp body and the surface ring, this disclosure enables the separation of the surface ring from the lamp body, which greatly reduces the packaging and transportation space. Moreover, by configuring an infinite-position clamping connection mode between the lamp body and the surface ring, this disclosure enables a 360-degree fastening installation therebetween, making the downlight structure more sturdy and the installation more convenient. The surface ring has a concave structure, which allows multiple surface rings to be stacked together during transportation, saving the packaging and transportation. The spring part is L-shaped, which eliminates the need for screws to fix the spring part, achieving high-point fixation and low-point limitation, and allows changing the position of the buckle. This also solves the problem regarding the installation height of the spring part.

The descriptions of the steps or structures corresponding to the drawings are respectively emphasized, and some steps or structures that are not detailed can be referred to the relevant descriptions of other steps or structures.

The above-mentioned embodiments are for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the scope of the present disclosure.

The invention claimed is:

1. A downlight, comprising a lamp body and a surface ring; wherein the lamp body is provided with at least one first clamping part and at least one second clamping part; at least one spring part is matingly connected to the lamp body through the first clamping part or the second clamping part;

the lamp body is detachably connected with the surface ring;

wherein the lamp body has an opening; the first clamping part and the second clamping part are disposed at an outer region of a bottom plate of the lamp body; at least one connecting lug is disposed at an edge of the outer region of the bottom plate of the lamp body; each connecting lug corresponds to one of the at least one first clamping part, and one of the at least one second clamping part, and each connecting lug shares a same axis with the corresponding first clamping part and second clamping part.

2. The downlight according to claim 1, wherein the first clamping part and the second clamping part comprise buckles.

3. The downlight according to claim 2, wherein the buckles are protruding buckles.

4. The downlight according to claim 2, wherein the first clamping part is a protruding buckle; the second clamping part is a U-shaped protruding buckle; the first clamping part is located in the second clamping part; a length of the first clamping part is smaller than a width of the second clamping part.

5. The downlight according to claim 1, wherein the lamp body is provided with at least two groups of first clamping parts, second clamping parts, and connecting lugs.

6. The downlight according to claim 1, wherein the spring part is L-shaped; the spring part comprises a spring body and two elastic arms, wherein the two elastic arms extend outwardly from the spring body at different angles; the spring body is provided with a spring fixing frame; the spring fixing frame is a lengthened and outwardly bended coil of the spring body; the spring fixing frame is matingly connected with the first clamping part or second clamping part through the connecting lug.

7. The downlight according to claim 1, wherein a first connecting part is disposed at an outer side wall of the lamp body; the first connecting part is of a circular structure, whose substructures are uniformly distributed around the outer side wall of the lamp body; the lamp body is matingly connected with the surface ring through the first connecting part.

8. The downlight according to claim 7, wherein a second connecting part is disposed at an inner side wall of the surface ring; the second connecting part is of a circular structure, whose substructures are uniformly distributed around the inner side wall of the surface ring; the second connecting part is matingly connected with the first connecting part.

9. The downlight according to claim 8, wherein the first connecting part is a buckle and is disposed at a lower end of the outer side wall of the lamp body; the second connecting part is a slot and is disposed at an upper end of the inner side wall of the surface ring.

10. The downlight according to claim 8, wherein the first connecting part is a slot and is disposed at a lower end of the outer side wall of the lamp body; the second connecting part is a buckle and is disposed at an upper end of the inner side wall of the surface ring.

11. The downlight according to claim 1, wherein the surface ring is of a concave structure.

* * * * *